United States Patent
Damnjanovic et al.

(10) Patent No.: US 9,021,144 B2
(45) Date of Patent: Apr. 28, 2015

(54) BUFFER STATUS REPORT TRIGGERS IN WIRELESS COMMUNICATIONS

(71) Applicant: QUALCOMM Incorporated, San Diego, CA (US)

(72) Inventors: Aleksandar Damnjanovic, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 13/931,172

(22) Filed: Jun. 28, 2013

(65) Prior Publication Data
US 2013/0294337 A1 Nov. 7, 2013

Related U.S. Application Data

(63) Continuation of application No. 12/552,176, filed on Sep. 1, 2009, now Pat. No. 8,639,997.

(51) Int. Cl.
G06F 3/06 (2006.01)
G06F 5/00 (2006.01)
H04W 24/10 (2009.01)
G06F 17/12 (2006.01)
G06F 17/16 (2006.01)
(Continued)

(52) U.S. Cl.
CPC ............. H04W 24/10 (2013.01); G06F 17/12 (2013.01); G06F 17/16 (2013.01)

(58) Field of Classification Search
None
See application file for complete search history.

(56) References Cited

U.S. PATENT DOCUMENTS 7,139,259 B2 11/2006 Qu et al.
7,769,926 B2 8/2010 Wu et al.
7,953,064 B2 5/2011 Ahluwalia
(Continued)

FOREIGN PATENT DOCUMENTS

EP 1509011 A2 2/2005
EP 1871057 A1 12/2007
(Continued)

OTHER PUBLICATIONS

3GPP: "3GPP TS 36.321 V8.2.0 (May 2008); 3rd Generation Partnership Project; Technical Specification Group Radio Access Network; Evolved Universal Terrestrial Radio Access (E-UTRA) Medium Access Control (MAC) protocol specification (Release 8)"3GPP" May 1, 2008, pp. 1-33, XP002554062 chapter 5.4.5 Buffer Status Reporting".
(Continued)

*Primary Examiner* — Scott Sun
(74) *Attorney, Agent, or Firm* — Nerrie M. Zohn

(57) ABSTRACT

Systems and methodologies are described that facilitate utilizing timers in conjunction with transmitting buffer status reports (BSR). A prohibit timer can be utilized to determine when BSRs can be transmitted to an eNB. The prohibit timer can be initialized or restarted upon transmitting a BSR to an eNB. A BSR retransmit timer can be used to determine when to retransmit a BSR. The BSR retransmit timer can be initialized upon transmitting a BSR to an eNB and restarted each time an uplink resource allocation is received from the eNB. Once the timer expires, if an uplink transmission buffer contains data (e.g., size>0), the BSR can be retransmitted to the eNB. Control data feedback can additionally be used to determine when to retransmit the BSR. In addition, in either case, the timer duration values can be provided by the eNB.

31 Claims, 13 Drawing Sheets

(51) Int. Cl.
*G06F 13/00* (2006.01)
*G06F 13/38* (2006.01)

(56) References Cited

U.S. PATENT DOCUMENTS

| | | | |
|---|---|---|---|
| 2006/0246847 A1 | 11/2006 | Kim et al. | |
| 2007/0091810 A1 | 4/2007 | Kim et al. | |
| 2008/0004058 A1* | 1/2008 | Jeong et al. | 455/517 |
| 2010/0070814 A1 | 3/2010 | Damnjanovic et al. | |
| 2010/0080185 A1* | 4/2010 | Guo | 370/329 |

FOREIGN PATENT DOCUMENTS

| | | |
|---|---|---|
| WO | WO-2006083149 A1 | 8/2006 |
| WO | WO-2008060077 A1 | 5/2008 |
| WO | WO-2009035301 A2 | 3/2009 |

OTHER PUBLICATIONS

3GPP TSG-RAN WG2 #63bis R2-085142 6.1.1.6 UL Information for scheduler BSR Robustness, Discussion, Decision, Qualcomm Europe, pp. 1-pp. 2, Sep. 29-Oct. 3, 2008, Prague, Czech Republic.
"3rd Generation Partnership Project; Technical Specification Group Radio Access Network; Evolved Universal Terrestrial Radio Access (E-UTRA) Medium Access Control (MAC) protocol specification" (Release 8), 3GPP TS 36.321 V8.6.0 (Jun. 2009).
"3rd Generation Partnership Project; Technical Specification Group Radio Access Network; Evolved Universal Terrestrial Radio Access (E-UTRA); Packet Data Convergence Protocol (PDCP) specification" (Release), 3GPP TS 36.323 V8.6.0 (Jun. 2009).
"3rd Generation Partnership Project; Technical Specification Group Radio Access Network; Evolved Universal Terrestrial Radio Access (E-UTRA) Radio Link Control (RLC) protocol specification" (Release 8), 3GPP TS 36.322 V8.6.0 (Jun. 2009).
Al-Rawi M., et al., "Opportunistic uplink scheduling for 3GL Te systems", May 2008, IEEE, pp. 705-709.
Ericsson et al. "Framework for Scheduling Request and Buffer Status Reporting", TSG-RAN WG2 Meeting #60, R2-074691.
Ericsson et al: "Robustness of Buffer Status Reporting" 3GPP DRAFT; 36321_CR0138(REL-8)_R2-086167, 3rd Generation Partnership Project (3GPP), Mobile Competence Centre ; 650, Route Des Lucioles; F-06921 Sophia-Antipolis Cedex France, no. Prague, Czech Republic; Nov. 3, 2008,XP050320981 [retrieved on Nov. 3, 2008] the whole document.
International Search Report & Written Opinion—PCT/US2009/055900, International Search Report Authority—European Patent Office—Jan. 27, 2010.
International search report and Written Opinion—PCT/US2009/053467, International Search Authority—European Patent Office—Jan. 21, 2010.
Nokia Corporation et al: "Introduction of Enhanced Uplink in Cell_Fach in 25.319" 3GPP DRAFT; 25319CR0022_(REL-8)_R2-082720, 3rd Generation Partnership Project (3GPP); Mobile Competence Centre ; 650, Route Des Lucioles ; F-06921 Sophia-Antipolis Cedex France, vol. RAN WG2, no. Kansas City, USA; 20080509, May 9, 2008, XP050139739 [retrieved on May 9, 2008] chapter "9.3 Signalling".
Qualcomm Europe, 3GPP TSG-RAN WG2 #60 R2-075165 "BRS Triggers", Nov. 12, 2007 (database published date), 3GPP, p. 1.
Qualcomm Europe: "BSR Robustness" 3GPP Draft; R2-084141, 3rd Generation Partnership Project (3GPP), Mobile Competence Centre ; 650, Route Des Lucioles ; F-06921 Sophia-Antipolis Cedex; France, no. Jeju; 200880812, Aug. 12, 2008, XP0503192283 [retrieved on Aug. 12, 2008] the whole document.
Qualcomm Europe: "BSR Triggers" 3GPP Draft; R2-080375, 3rd Generation Partnership Project (3GPP), Mobile Competence Centre ; 650, Route Des Lucioles ; F-06921 Sophia-Antipolis Cedex; France, vol. RAN WG2, no. Sevilla, Spain; 20080108, Jan. 8, 2008, XP050138229 [retrieved on Jan. 8, 2008 ]pp. 1-3, paragraphs 2,3. 1,5.4.4.5.4.5,4.
"Reliability of BSR", 3GPP TSG-RAN2 Meeting #62bis, Tdoc R2-083498, Warsaw, Polland, Jun. 30-Jul. 4, 2008.
"Robustness of Buffer Status Reporting", TSG-RAN WG2 Meeting #62bis, R2-083149, Warsaw, Poland, Jun. 30-Jul. 4, 2008.
Taiwan Search Report—TW098127011—TIPO—Jan. 29, 2013.
Taiwan Search Report—TW098129743—TIPO—Aug. 21, 2012.
"Uplink Scheduling information in E-UTRAN", 3GPP TSG-RAN WG2 Meeting #60, Jeju, South Korea, Nov. 5-9, 2007.
Wang H., et al., "A novel bidirectional resource allocation to decrease signaling for retransmission in L TE system", 2008, IEEE, pp. 2269-2271.

* cited by examiner

BUFFER STATUS REPORT TRIGGERS IN WIRELESS COMMUNICATIONS

CROSS-REFERENCE

This application is a Continuation of U.S. Ser. No. 12/552,176, filed Sep. 1, 2009, entitled "BUFFER STATUS REPORT TRIGGERS IN WIRELESS COMMUNICATION", which claims the benefit of U.S. Provisional Application Ser. No. 61/093,824, filed Sep. 3, 2008, and entitled "CONTROL OF BUFFER STATUS REPORT TRIGGERS FOR MOBILE COMMUNICATION SYSTEMS," the entirety of which is incorporated herein by reference.

BACKGROUND

I. Field

The present disclosure relates generally to wireless communications and more specifically to transmitting buffer status reports.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In fully scheduled systems, such as LTE, access points can provide uplink resources to mobile devices upon receiving indication that such resources are required to transmit data to the access point. In one example, mobile devices can provide buffer status reports (BSR) to the access points in certain scenarios to trigger downlink resource assignment from the access point. The BSRs, for example, can additionally indicate a size of data in the buffer, which the access point can use to determine a resource allocation size for the mobile device.

Mobile devices currently transmit BSRs in three scenarios: when data arrives in the uplink transmission buffer at the mobile device that belongs to a radio bearer of higher priority than data currently in the buffer, when uplink shared channel resources are allocated and a number of padding bits is larger than the BSR size, and when the mobile device arrives at a new cell. The first scenario additionally triggers a scheduling request to the access point to receive an uplink grant for transmitting the BSR, whereas in the latter two scenarios, the uplink grant has been received and a BSR can be transmitted thereover.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating transmitting buffer status reports (BSR) to an access point according to one or more timers or other events. For example, a BSR can be transmitted to an access point for new data in the uplink transmission buffer upon expiration of a prohibit timer. In another example, a BSR can be retransmitted to the access point where the uplink transmission buffer contains data and a repetition timer has expired. The prohibit and/or repetition timers, for example, can be configured via signaling from the access point allowing the access point to control rate of receiving BSRs from given mobile devices. In another example, a BSR can be retransmitted to the access point after a maximum number of retransmissions have occurred and control feedback from the access point indicates that the transport block carrying the BSR is not successfully received.

According to related aspects, a method is provided that includes transmitting a BSR that indicates information regarding data in an uplink transmission buffer. The method also includes receiving an uplink resource allocation in response to the BSR and restarting a BSR retransmit timer upon receiving the uplink resource allocation.

Another aspect relates to a wireless communications apparatus. The wireless communications apparatus can include at least one processor configured to provide a BSR related to an uplink transmission buffer and obtain an uplink resource allocation in response to the BSR. The at least one processor is further configured to restart a BSR retransmit timer upon obtaining the uplink resource allocation. The wireless communications apparatus also comprises a memory coupled to the at least one processor.

Yet another aspect relates to an apparatus. The apparatus includes means for transmitting a BSR indicating information regarding data in an uplink transmission buffer and means for receiving an uplink resource allocation for the data in the uplink transmission buffer. The apparatus further includes means for restarting a BSR retransmit timer upon receiving the uplink resource allocation.

Still another aspect relates to a computer program product, which can have a computer-readable medium including code for causing at least one computer to transmit a BSR that indicates information regarding data in an uplink transmission buffer. The computer-readable medium can also comprise code for causing the at least one computer to receive an uplink resource allocation in response to the BSR and code for causing the at least one computer to restart a BSR retransmit timer upon receiving the uplink resource allocation.

Moreover, an additional aspect relates to an apparatus including a BSR transmitting component that transmits a BSR indicating information regarding data in an uplink transmission buffer. The apparatus can further include a resource allocation receiving component that obtains an uplink resource allocation for the data in the uplink transmission buffer and a timer component that restarts a BSR retransmit timer upon receiving the uplink resource allocation.

According to further aspects, a method is provided that includes transmitting a BSR that indicates information regarding data in an uplink transmission buffer. The method also includes initializing a prohibit timer in conjunction with transmitting the BSR that relates to timing of transmitting a subsequent BSR.

Another aspect relates to a wireless communications apparatus. The wireless communications apparatus can include at least one processor configured to provide a BSR that indicates information regarding data in an uplink transmission buffer. The at least one processor is further configured to start a prohibit timer in conjunction with transmitting the BSR that relates to timing of transmitting a subsequent BSR. The wireless communications apparatus also comprises a memory coupled to the at least one processor.

Yet another aspect relates to an apparatus. The apparatus includes means for transmitting a BSR that indicates information regarding data in an uplink transmission buffer. The apparatus further includes means for initializing or restarting a prohibit timer that relates to timing of transmitting a subsequent BSR in conjunction with transmitting the BSR.

Still another aspect relates to a computer program product, which can have a computer-readable medium including code for causing at least one computer to transmit a BSR that indicates information regarding data in an uplink transmission buffer. The computer-readable medium can also comprise code for causing the at least one computer to initialize a prohibit timer in conjunction with transmitting the BSR that relates to timing of transmitting a subsequent BSR.

Moreover, an additional aspect relates to an apparatus including a BSR transmitting component that transmits a BSR that indicates information regarding data in an uplink transmission buffer. The apparatus can further include a timer component that initializes or restarts a prohibit timer that relates to timing of transmitting a subsequent BSR in conjunction with transmitting the BSR.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
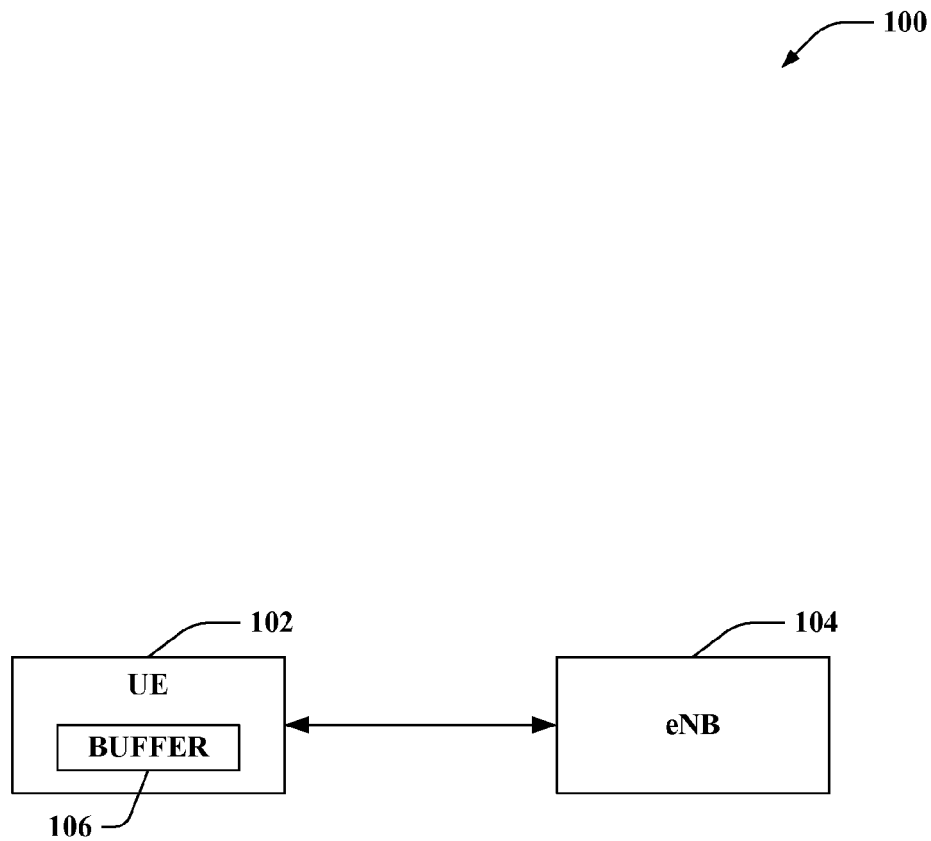
FIG. 1 is a block diagram of a system for providing buffer status reports (BSR) according to one or more timers.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates providing buffer status reports (BSR) to eNBs to facilitate uplink resource allocation. System 100 includes a UE 102 that communicates with an eNB 104 to receive access to a wireless network. UE 102 includes an uplink transmission buffer 106 that queues data for transmitting over uplink resources to the eNB 104. In addition, UE 102 can transmit a BSR to eNB 104 to trigger an uplink resource allocation from the eNB 104 (such as a physical downlink shared channel (PDSCH) allocation in LTE), and the eNB 104 can provide such resources according to the BSR. It is to be appreciated that the UE 102 can receive an initial uplink resource grant from the eNB 104 to transmit the BSR (such as based on transmitting a scheduling request, as part of a random access channel (RACH) procedure, and/or the like). The BSR, for example, can indicate a size of the data in the uplink transmission buffer 106 and/or a size range, which the eNB 104 can utilize to determine parameters for the uplink resource allocation, such as total allocation size, packet data unit (PDU) size, whether to allocate resources on an additional carrier (e.g., in a multicarrier configuration), and/or the like.

According to an example, UE 102 can transmit BSRs to the eNB 104 according to one or more timers or events. In one example, UE 102 can transmit a BSR to eNB 104 upon new data arriving in the uplink transmission buffer 106 and a prohibit timer. The prohibit timer can be set to avoid overloading the eNB 104 with BSRs, as the uplink transmission buffer 106 can frequently receive uplink data to transmit. The prohibit timer thus allows data to queue up in the uplink transmission buffer 106 for a period of time, and upon expiration of the prohibit timer, UE 102 can transmit a BSR related to the contents of the uplink transmission buffer 106 to the eNB 104. After transmitting the BSR, the prohibit timer can restart for the next BSR transmission. It is to be appreciated that where the prohibit timer expires and there is no data in the uplink transmission buffer 106, once data enters the uplink transmission buffer 106, a BSR can be transmitted and the prohibit timer can restart. In addition, in one example, the prohibit timer duration can be signaled to the UE by the eNB 104 (e.g., via radio resource control (RRC) layer signaling and/or the like). In this regard, eNB 104 can throttle the rate at which BSRs are received from a given UE.

According to another example, upon receiving an uplink resource allocation (and/or after transmitting the BSR), UE 102 can initialize a BSR retransmit timer. In addition, UE 102 can restart the BSR retransmit timer each time it receives an uplink resource allocation for data in the uplink transmission buffer 106 from eNB 104. After transmitting the BSR and/or a portion of the related data in the uplink transmission buffer 106 to the eNB 104, it is possible that data remains in the uplink transmission buffer 106 and not reported to the eNB 104 (e.g., where the UE 102 and eNB 104 are out of synch). Thus, when the BSR retransmit timer expires, the UE 102 can determine whether there is still data in the uplink transmission buffer 106 (e.g., where the buffer size is greater than zero), and if so, can retransmit the BSR to the eNB 104.

Similarly to the prohibit timer, the BSR retransmit timer can be signaled to the UE 102 by the eNB 104 (e.g., in an RRC layer signal). Moreover, for example, the UE 102 can trigger retransmission of the BSR based at least in part on hybrid automatic repeat/request (HARQ) feedback from the eNB 104. In this example, after a maximum number of retransmissions are sent according to the BSR retransmit timer for a given BSR, if HARQ feedback from the eNB 104 indicates the transport block carrying the BSR from the UE 102 is not successfully received, the UE 102 can retransmit the BSR to eNB 104. It is to be appreciated that in either of the above examples, the UE 102 can additionally transmit data with the BSR where a resource allocation is large enough.

Figure 2:
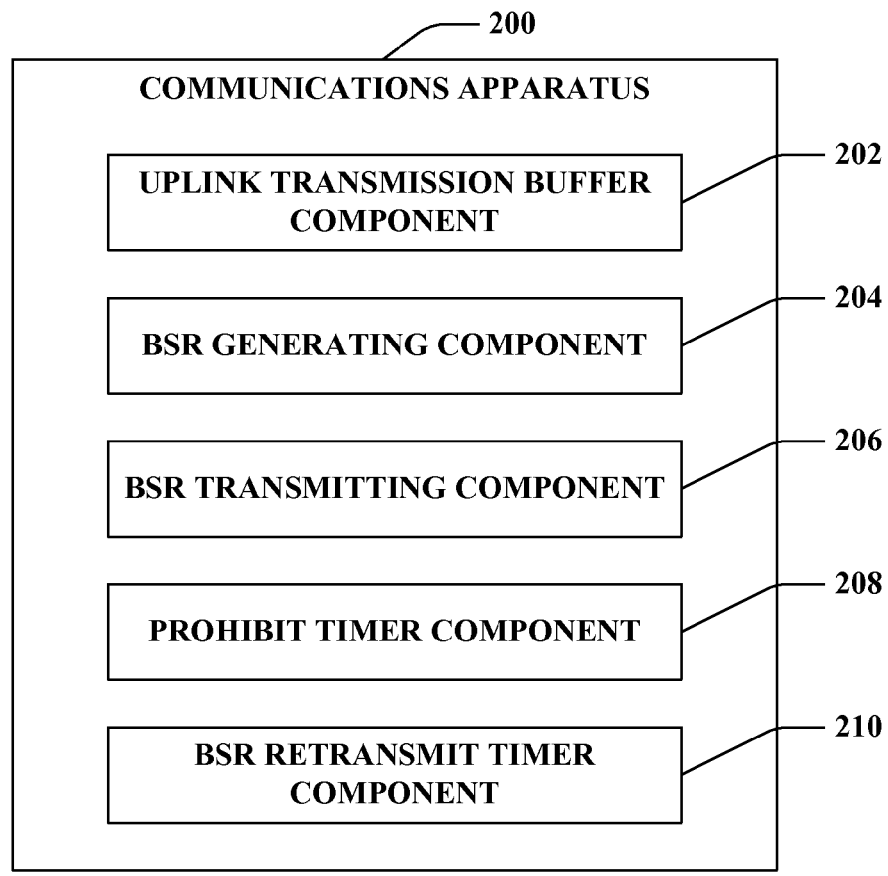
FIG. 2 is an illustration of an example communications apparatus for employment within a wireless communications environment.

Referring next to FIG. 2, a communications apparatus 200 that can participate in a wireless communications network is illustrated. The communications apparatus 200 can be mobile device, a portion thereof, or substantially any device that can receive access to a wireless network. The communications apparatus 200 can include an uplink transmission buffer component 202 that can receive data for transmitting over uplink resources, a BSR generating component 204 that creates a BSR based on an uplink transmission buffer component 202 status, a BSR transmitting component 206 that provides the BSR to one or more access points to receive uplink resources for transmitting data in the uplink transmission buffer component 202, a prohibit timer component 208 that determines when BSRs can be transmitted for new data in the uplink transmission buffer component 202, and a BSR retransmit timer component 210 that can determine when to retransmit a BSR related to data in the uplink transmission buffer component 202.

According to an example, communications apparatus 200 can receive an uplink grant from an access point (not shown) to transmit data thereto. Uplink transmission buffer component 202 can receive data to transmit to the access point over uplink resources. BSR generating component 204 can create a BSR related to data in an uplink transmission buffer, as described, and BSR transmitting component 206 can transmit the BSR to the access point to receive uplink resources for transmitting data in the uplink transmission buffer component 202. In one example, the BSR can comprise information regarding size of the data in the uplink transmission buffer, and the access point can allocate uplink resources for the communications apparatus 200 based at least in part on the buffer size. Communications apparatus 200 can transmit the contents of the uplink transmission buffer component 202 over the allocated uplink resources and the uplink transmission buffer component 202 can clear the contents upon successful receipt, for example.

In one example, once the BSR transmitting component 206 transmits the BSR, prohibit timer component 208 can initialize or restart. In this regard, upon subsequent data entering the uplink transmission buffer component 202, BSR generating component 204 can generate a BSR (and/or BSR transmitting component 206 can transmit a BSR) only when the timer of the prohibit timer component 208 is expired, for example. It is to be appreciated, as described, that the prohibit timer component 208 can be restarted with each BSR transmission.

In another example, BSR retransmit timer component 210 can be initialized or restarted upon communications apparatus 200 receiving the uplink resources for transmitting at least a portion of uplink data in the uplink transmission buffer, upon BSR transmitting component 206 transmitting the BSR, and/or the like. As described, BSR retransmit timer component 210 can be restarted upon receiving subsequent uplink resource allocations. BSR transmitting component 206 can retransmit a previously transmitted BSR to the access point if the uplink transmission buffer component 202 has data (e.g., the buffer size is not zero) and the timer of the BSR retransmit timer component 210 expires. Moreover, as described, where a maximum number of retransmissions are exhausted based on the BSR retransmit timer component 210, BSR transmitting component 206 can evaluate HARQ feedback related to a transport block that carries the BSR to determine whether the block was successfully received. If not, the BSR transmitting component 206 can retransmit the BSR as a HARQ retransmission, in one example.

Figure 3:
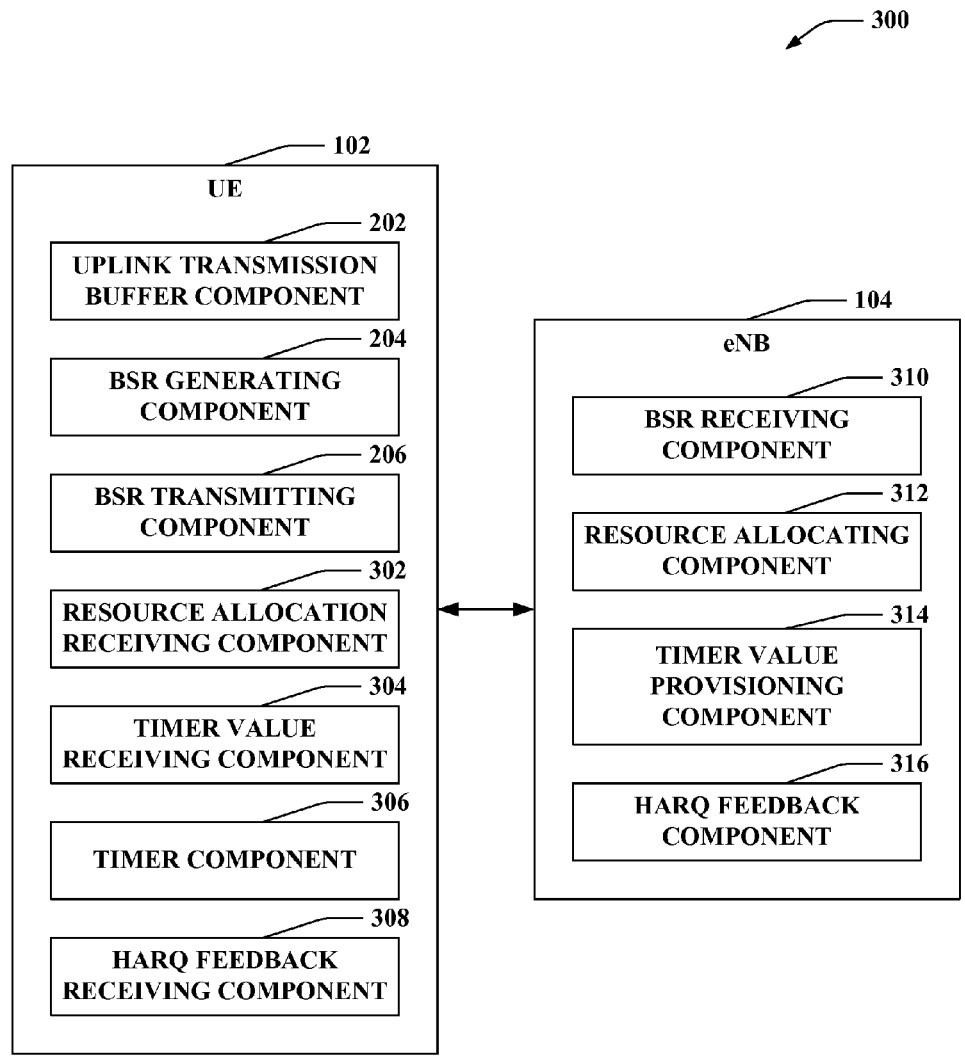
FIG. 3 illustrates an example wireless communication network that effectuates utilizing timers in communicating BSRs.

Now referring to FIG. 3, illustrated is a wireless communications system 300 that facilitates transmitting BSRs according to one or more timers or events. System 300 includes a UE 102, which can be substantially any type of mobile device, a portion thereof, or substantially any device that receives access to a wireless network. System 300 also includes an eNB 104, with which the UE 102 communicates to receive wireless network access, which can be substantially any type of base station or mobile device (including not only independently powered devices, but also modems, for example) that provides wireless network access, and/or portion thereof. Moreover, system 300 can be a MIMO system and/or can conform to one or more wireless network system specifications (e.g., EV-DO, 3GPP, 3GPP2, 3GPP LTE, WiMAX, etc.). In addition, it is appreciated that the functionalities described in terms of uplink communication herein can also be applied to any sort of communications that involves transmitting buffer status reports, in one example.

UE 102 can include an uplink transmission buffer component 202 that receives data for transmission over uplink communications resources, a BSR generating component 204 that can create a BSR related to data in the uplink transmission buffer component 202, a BSR transmitting component 206 that can provide the BSR to one or more eNBs, a resource allocation receiving component 302 that can obtain an uplink resource allocation from one or more eNBs (e.g., in response to the BSR), a timer value receiving component 304 that can obtain one or more timer duration values related to transmitting BSRs to an eNB, a timer component 306 that can initialize and/or restart timers according to timer duration values to facilitate timed transmitting or retransmitting of BSRs, and a HARQ feedback receiving component 308 that can obtain control data from one or more eNBs over a downlink control channel related to uplink resources allocated by the eNB.

eNB 104 includes a BSR receiving component 310 that can obtain one or more BSRs from a UE, a resource allocating component 312 that can assign uplink communications resources to the UE based on the BSR, a timer value provisioning component 314 that can generate or otherwise provide timer values related to transmitting or retransmitting BSRs, and a HARQ feedback component 316 that can provide control data over a downlink control channel related to an uplink data channel.

According to an example, eNB 104 can provide an uplink grant to the UE 102, which can be as part of a scheduling request, RACH procedure, and/or the like. UE 102 can generate data to send to the eNB 104, and the data can be queued in the uplink transmission buffer component 202. Upon data entering the uplink transmission buffer component 202, BSR generating component 204 can create a BSR related to the data in the uplink transmission buffer component 202, which the BSR transmitting component 206 can transmit to the eNB 104. As described, the BSR can comprise information regarding size of the data in the uplink transmission buffer component 202, such as an actual size, a size range, and/or the like.

The BSR receiving component 310 can obtain the BSR from the UE 102, and the resource allocating component 312 can assign uplink communications resources, such as shared data channel resources (e.g., PDSCH in LTE), to the UE 102 according to the BSR. For example, where the BSR indicates a large amount of data in the uplink transmission buffer component 202, the resource allocating component 312 can assign a large number of resources to the UE 102 for transmitting such data. In this regard, the BSR can be a trigger to allocate resources as well as a specification of resource requirement at the UE 102. Resource allocation receiving component 302 can obtain the uplink communications resource from the eNB 104 over which BSR transmitting component 206 can transmit the contents of the uplink transmission buffer component 202.

In one example, UE 102 can implement a prohibit timer with respect to sending BSRs to the eNB 104. In this example, timer value receiving component 304 can obtain a duration for the prohibit timer. This can be obtained from a network specification, configuration, one or more disparate UEs 102, a core network, and/or the like. In another example, timer value provisioning component 314 can signal the timer value to the UE 102 (e.g., in an RRC layer signal), and the timer value receiving component 304 can receive the timer value. The timer value provisioning component 314 can similarly receive the timer value from a network specification, configuration, core network, etc. In one example, the timer value provisioning component 314 can generate the timer value based on one or more aspects of the eNB 104, such as traffic, cell load, backhaul load, available resources, and/or the like, such that the timer can ensure the eNB 104 is not overloaded with BSR transmissions.

In any case, timer component 306 can initialize or restart the prohibit timer upon the BSR transmitting component 206 transmitting the BSR to the eNB 104. In this example, when new data enters the uplink transmission buffer component 202, BSR generating component 204 can only generate a BSR (or BSR transmitting component 206 can only transmit the BSR) upon determining that the prohibit timer has expired (e.g., by querying the timer component 306, receiving a notification of expiration from the timer component, etc.). When the BSR transmitting component transmits the BSR, the timer component 306 can restart the prohibit timer according to the received prohibit timer value, as described.

In another example, UE 102 can implement a BSR retransmit timer to ensure the eNB 104 receives the BSR. In one example, as described, the eNB 104 may not receive the BSR or subsequent data from the UE 102 due to lack of synchronization, and/or the like. In this regard, timer value receiving component 304 can obtain or determine a BSR retransmit timer value. Similarly, to the prohibit timer, this can be obtained from a network specification, configuration, one or more UEs, core network, from timer value provisioning component 314, and/or the like. Timer component 306 can initialize the BSR retransmit timer upon the BSR transmitting component 206 transmitting a BSR to eNB 104, for example. In addition, timer component 306 can initialize or restart the BSR retransmit timer according to the timer value each time uplink communications resources are received by the resource allocation receiving component 302, as described. Upon expiration of the BSR retransmit timer, if there is data in the uplink transmission buffer component 202 (e.g., the buffer size is greater than zero), the BSR transmitting component 206 can retransmit the BSR to the eNB 104. For example, the BSR can be a previously transmitted BSR and/or the BSR generating component 204 can create a new BSR for the BSR transmitting component 206 to transmit to eNB 104 based on the data remaining in the uplink transmission buffer component 202.

In addition, BSR transmitting component 206 can utilize HARQ feedback for determining when to retransmit a BSR. In one example, as described, HARQ feedback component 316 can transmit HARQ data, such as acknowledgement (ACK)/non-acknowledgement (NACK) over a downlink control channel related to uplink resources allocated to the UE 102. For example, the HARQ feedback receiving component 308 can determine whether an ACK or NACK is received for a transport block over which the BSR is sent, where a maximum number of retransmissions based on the BSR retransmit timer are exceeded. If a NACK is received from the HARQ feedback component 316 for the transport block, the BSR transmitting component 206 can retransmit the BSR to the eNB 104 as part of a HARQ procedure.

Referring now to FIGS. 4-7, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 4:
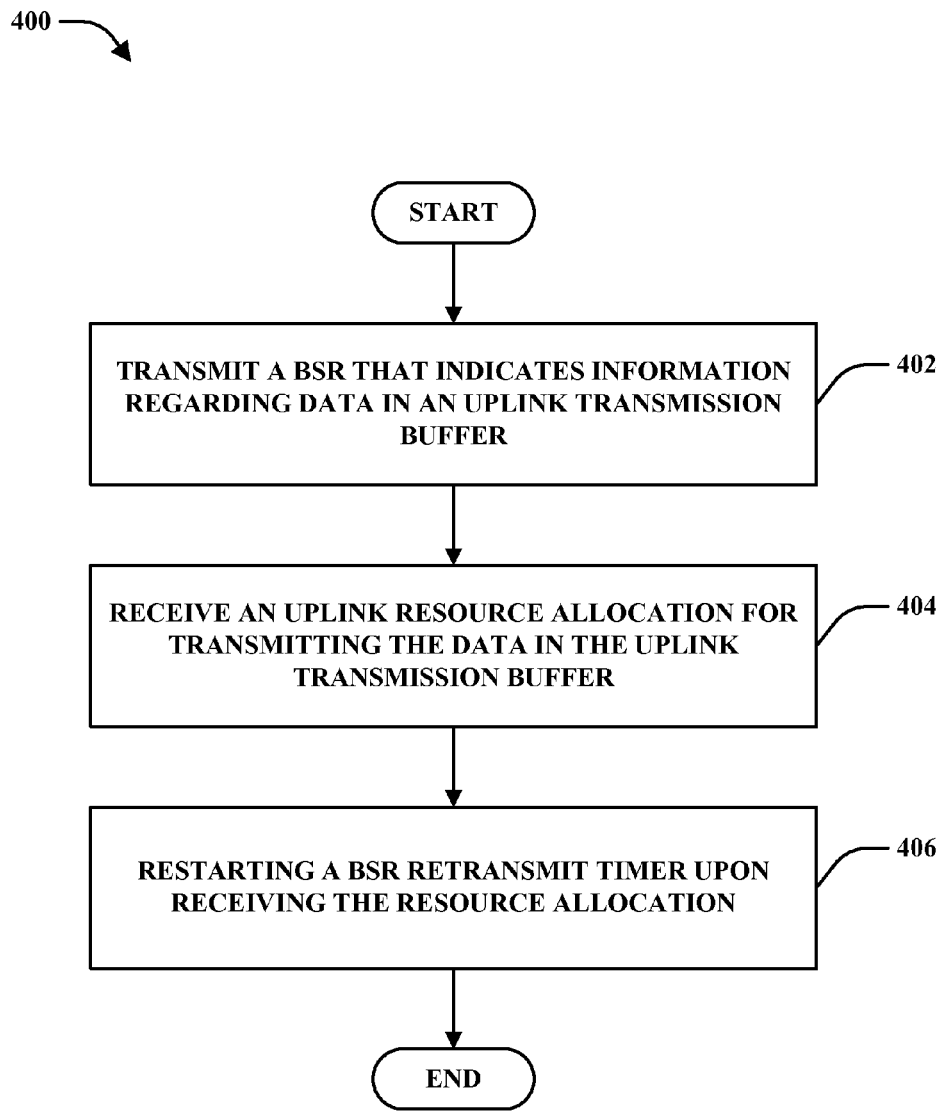
FIG. 4 is a flow diagram of an example methodology that facilitates transmitting BSRs according to a BSR retransmit timer.

With reference to FIG. 4, illustrated is a methodology 400 for maintaining a BSR retransmit timer to regulate retransmission of BSRs. At 402, a BSR that indicates information regarding data in an uplink transmission buffer can be transmitted. As described, the BSR can indicate a size of data in the transmission buffer, a range of size, and/or similar information. The BSR, for example, can cause an eNB, which can receive the BSR, to allocate uplink communication resources to transmit the data in the uplink transmission buffer. In this regard, an uplink resource allocation can be received for transmitting the data in the uplink transmission buffer at 404. In addition, at 406, a BSR retransmit timer can be restarted upon receiving the resource allocation. As described, the BSR retransmit timer can be restarted whenever an uplink resource allocation is received. In addition, the BSR timer can be initialized upon transmitting the BSR to the eNB at 402, as mentioned above.

Figure 5:
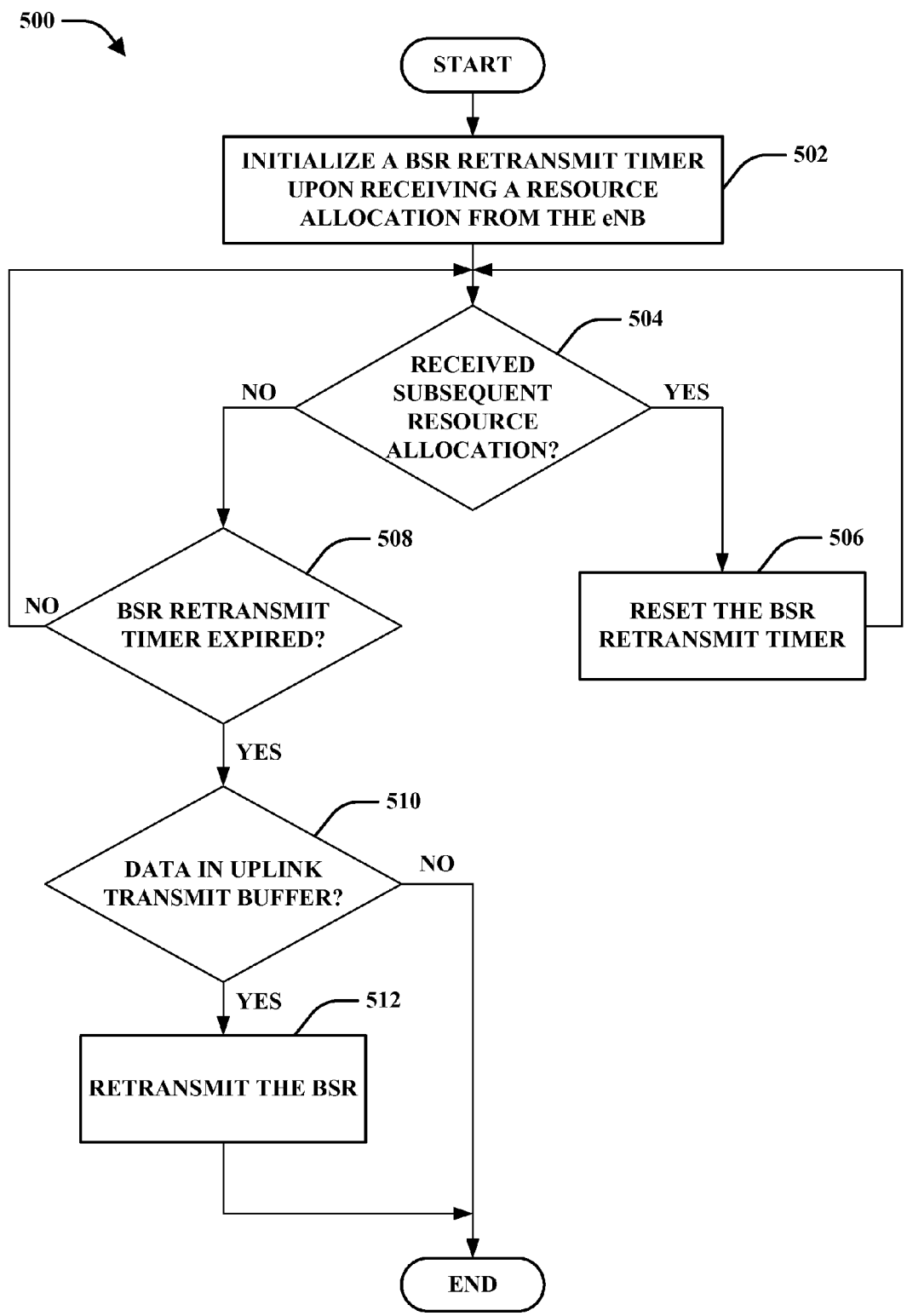
FIG. 5 is a flow diagram of an example methodology that utilizes a BSR retransmit timer in transmitting BSRs to an eNB.

Turning to FIG. 5, a methodology 500 is illustrated that utilizes a BSR retransmit timer to control BSR retransmissions. At 502, a BSR retransmit timer can be initialized upon receiving a resource allocation from the eNB. As described, the BSR retransmit timer can additionally or alternatively be started upon transmitting a BSR to the eNB. At 504, it can be determined whether a subsequent resource allocation is received. If so, at 506, the BSR retransmit timer can be reset, and the methodology continues back to 504. If a subsequent resource allocation is not received at 504, then at 508, it can be determined whether the BSR retransmit timer is expired. If not, the methodology can proceed to 504. It is to be appreciated that a waiting period can be introduced before proceeding to 504 in both cases, in one example. Alternatively, an event can be received when the BSR retransmit timer expires. If the BSR retransmit timer has expired at 508, it can be determined whether there is data in the uplink transmission buffer at 510. If there is data in the uplink transmission buffer, at 512, the BSR can be retransmitted, as described above. Moreover, it is to be appreciated that the where a resource allocation is received from retransmitting the BSR at 512, the methodology can begin again at 502. In addition, timer values for the BSR retransmit timer can be received from an eNB, as described.

Figure 6:
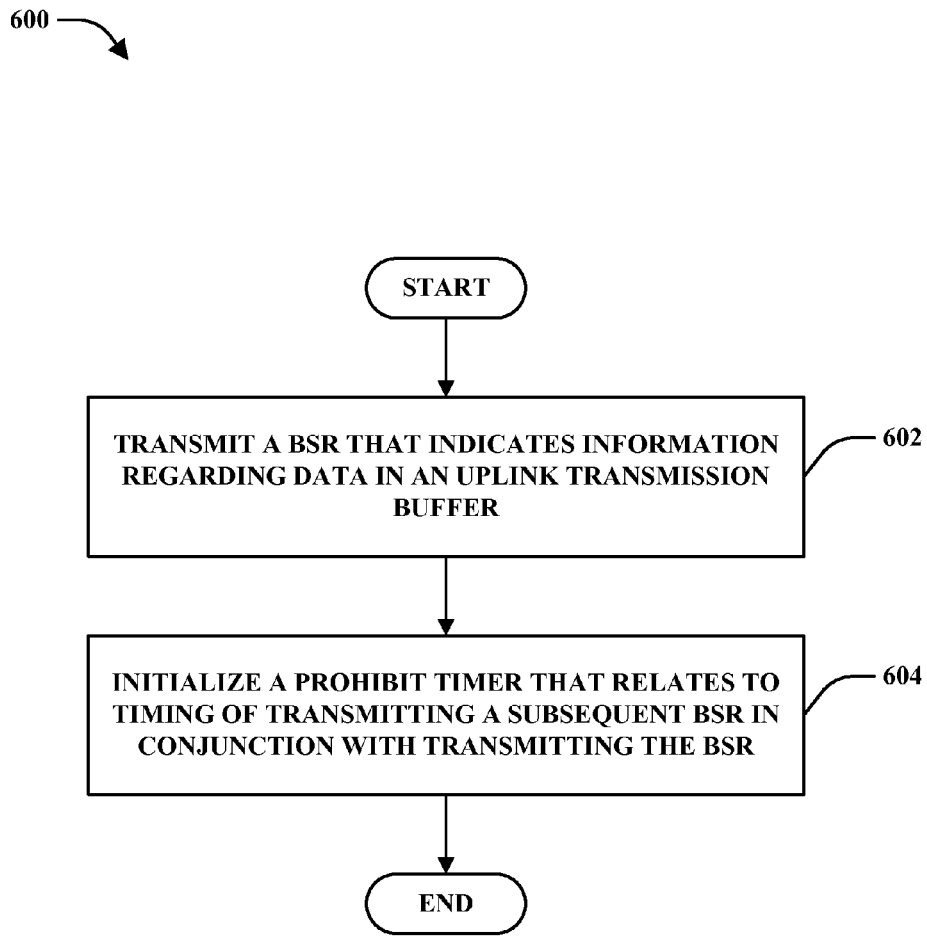
FIG. 6 is a flow diagram of an example methodology that facilitates transmitting BSRs according to a prohibit timer.

With reference to FIG. 6, illustrated is a methodology 600 for maintaining a prohibit timer to regulate transmission of BSRs when new data enters the uplink transmission buffer. At 602, a BSR can be transmitted that indicates information regarding data in an uplink transmission buffer. As described, the BSR can relate to data size, size range, etc. At 604, a prohibit timer that relates to timing of transmitting a subsequent BSR can be initialized in conjunction with transmitting the BSR. Thus, the prohibit timer can be used to determine when to send a subsequent BSR to an eNB, which can receive the initial BSR, as described.

Figure 7:
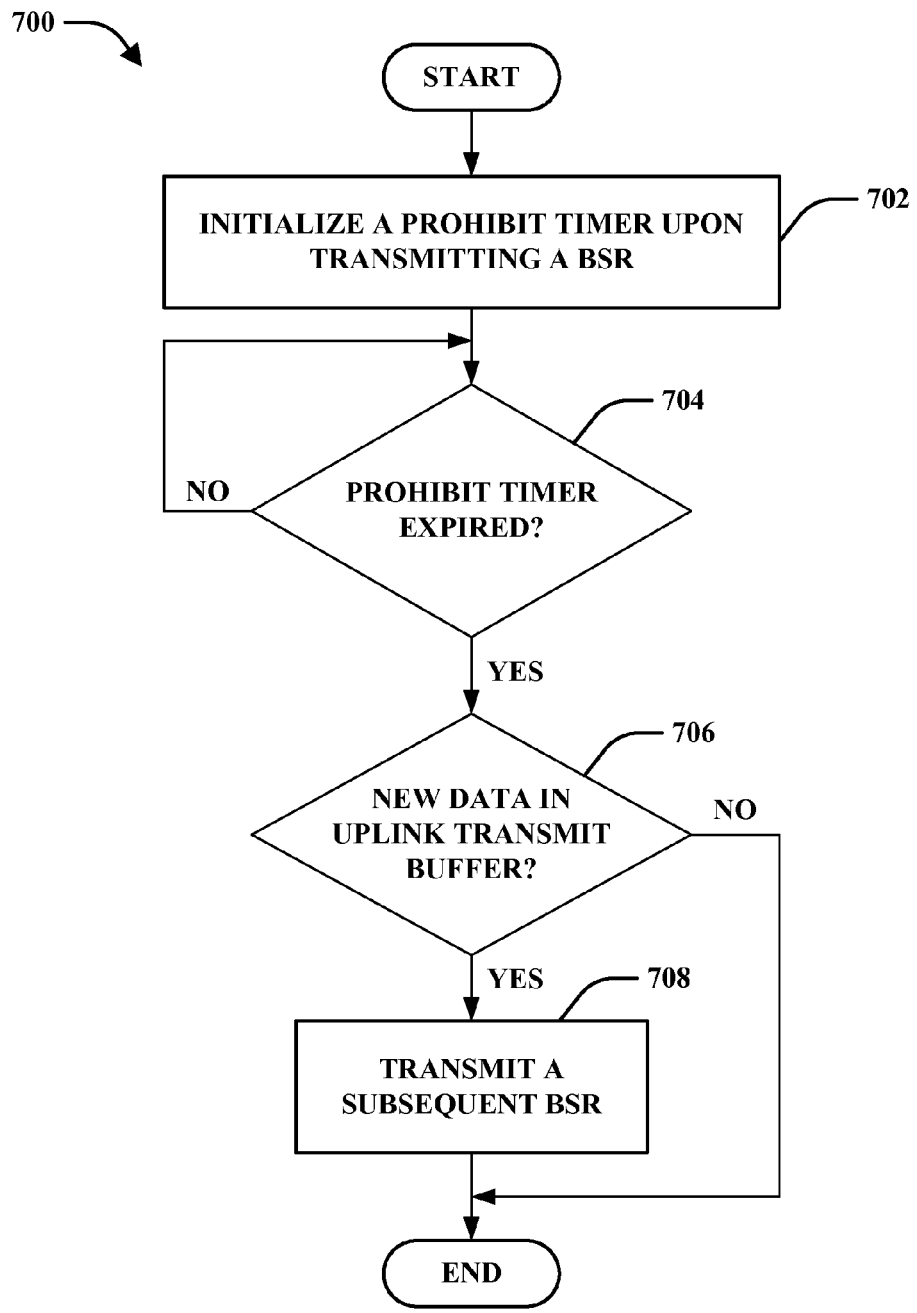
FIG. 7 is a flow diagram of an example methodology that utilizes a prohibit timer in transmitting BSRs to an eNB.

Turning to FIG. 7, a methodology 700 is illustrated that utilizes a prohibit timer to determine when to transmit BSRs to an eNB. At 702, a prohibit timer can be initialized upon transmitting a BSR. At 704, it can be determined whether the prohibit timer is expired. If not, the methodology can proceed to 704 again until the prohibit timer expires. It is to be appreciated that a waiting period can be introduced between checking the prohibit timer. Alternatively, an event can be received when the prohibit timer expires. Once the prohibit timer expires, it can be determined whether there is new data in the uplink transmit buffer at 706. If so, then at 708 a subsequent BSR can be transmitted to the eNB relating to the new data. Thus, BSR transmissions can be controlled so as not to overload an eNB with BSR transmissions, as described. In this regard, though not shown, timer values for the prohibit timer can be received from an eNB, as described.

It will be appreciated that, in accordance with one or more aspects described herein, inferences can be made regarding determining timer values, maximum number or timer-based retransmissions, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
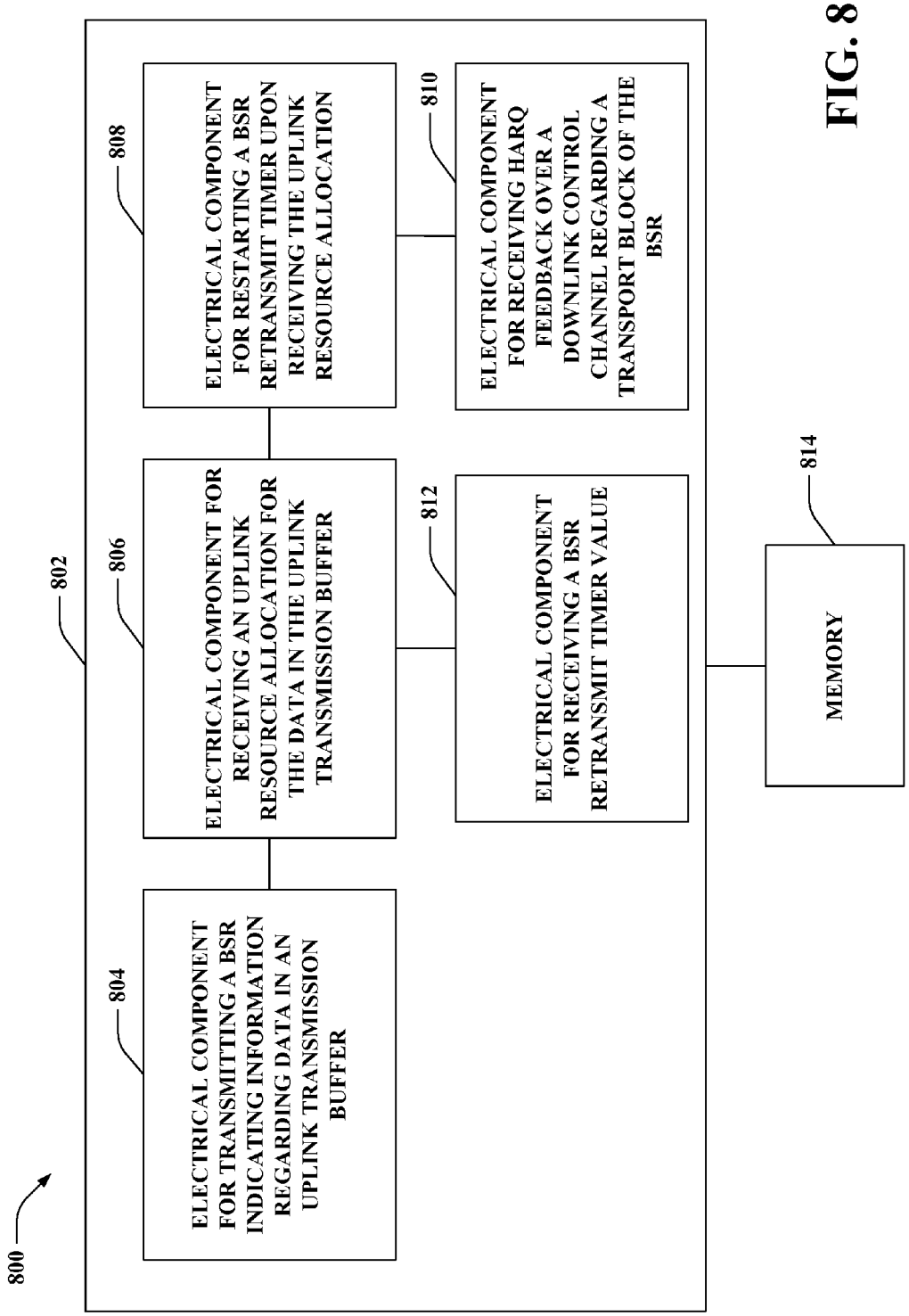
FIG. 8 is a block diagram of an example apparatus that transmits BSRs to an eNB according to a BSR retransmit timer.

With reference to FIG. 8, illustrated is a system 800 that uses a retransmit timer in communicating BSRs to an eNB. For example, system 800 can reside at least partially within a base station, mobile device, or another device that provides access to a wireless network. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for transmitting a BSR indicating information regarding data in an uplink transmission buffer 804. As described, the BSR can report a size or size range or other information related to the data and/or can cause an eNB, which can receive the BSR, to allocate resources for transmitting the data. Moreover, a BSR retransmit timer can be initialized upon transmitting the BSR, as described. Further, logical grouping 802 can comprise an electrical component for receiving an uplink resource allocation for the data in the uplink transmission buffer 806. In addition, logical grouping 802 can include an electrical component for restarting a BSR retransmit timer upon receiving the uplink resource allocation 808.

In one example, the electrical component 808 can restart the BSR retransmit timer for each uplink resource allocation that is received for transmitting the data in the uplink transmission buffer. Logical grouping 802 can also comprise an electrical component for receiving HARQ feedback over a downlink control channel regarding a transport block of the BSR. The feedback can be received by the eNB that receives the BSR, for example. As described, when the BSR retransmit timer expires, electrical component 804 can retransmit the BSR if the data is still in the uplink transmission buffer. If electrical component 804 exceeds a maximum number of retransmits using the BSR retransmit timer, the HARQ feedback can be evaluated by electrical component 810. If the feedback indicates that the transport block related to the BSR is not successfully received by the eNB, electrical component 804 can retransmit the BSR. Moreover, logical grouping 802 includes an electrical component for receiving a BSR retransmit timer value 812. As described, the BSR retransmit timer can be initialized and restarted according to the value. Additionally, system 800 can include a memory 814 that retains instructions for executing functions associated with electrical components 804, 806, 808, 810, and 812. While shown as being external to memory 814, it is to be understood that one or more of electrical components 804, 806, 808, 810, and 812 can exist within memory 814.

Figure 9:
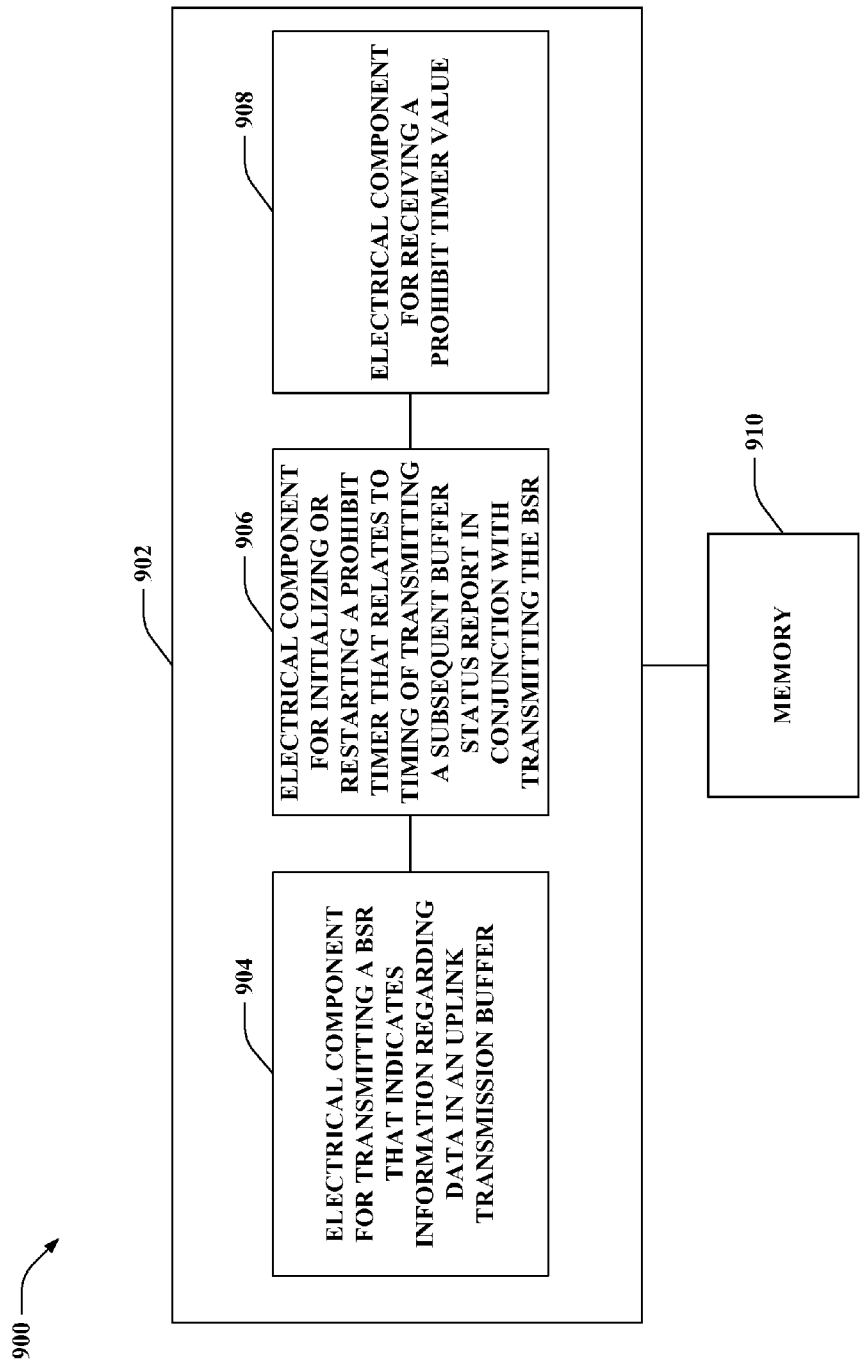
FIG. 9 is a block diagram of an example apparatus that transmits BSRs to an eNB according to a prohibit timer.

With reference to FIG. 9, illustrated is a system 900 that utilizes a prohibit timer when transmitting BSRs to an eNB. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for transmitting a BSR that indicates information regarding data in an uplink transmission buffer 904. As described, the electrical component 904 can transmit the BSR once a prohibit timer expires. Further, logical grouping 902 can comprise an electrical component for initializing or restarting a prohibit timer that relates to timing of transmitting a subsequent BSR in conjunction with transmitting the BSR 906. Moreover, logical grouping 902 includes an electrical component for receiving a prohibit timer value 908. As described, the prohibit timer value can be received from an eNB that receives the BSR to allow controlling of transmitting BSRs thereto, and can be used by electrical component 906 to initialize or restart the prohibit timer. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
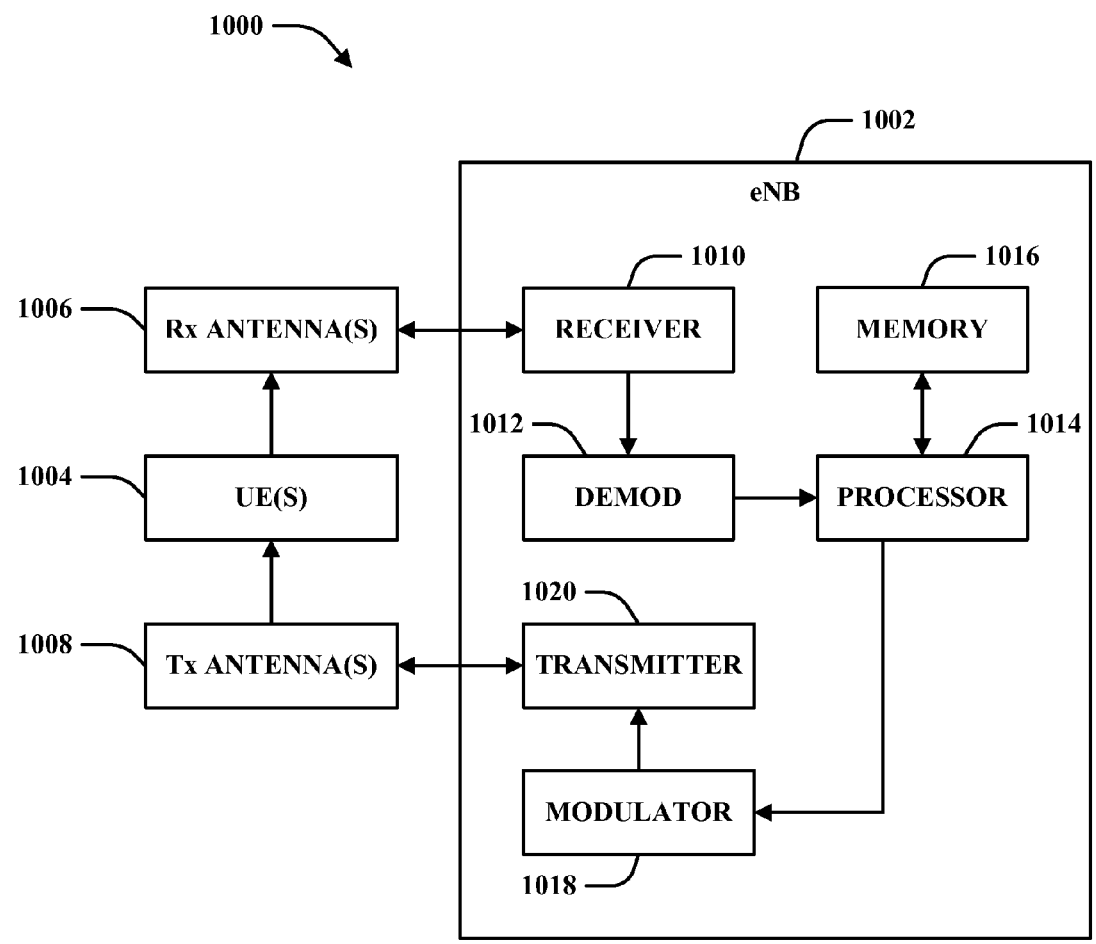
FIGS. 10-11 are block diagrams of example wireless communication devices that can be utilized to implement various aspects of the functionality described herein.

FIG. 10 is a block diagram of a system 1000 that can be utilized to implement various aspects of the functionality described herein. In one example, system 1000 includes a base station or eNB 1002. As illustrated, eNB 1002 can receive signal(s) from one or more UEs 1004 via one or more receive (Rx) antennas 1006 and transmit to the one or more UEs 1004 via one or more transmit (Tx) antennas 1008.

Additionally, eNB 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, eNB 1002 can employ processor 1014 to perform methodologies 400, 500, 600, 700, and/or other similar and appropriate methodologies. eNB 1002 can also include a modulator 1018 that can multiplex a signal for transmission by a transmitter 1020 through transmit antenna(s) 1008.

Figure 11:
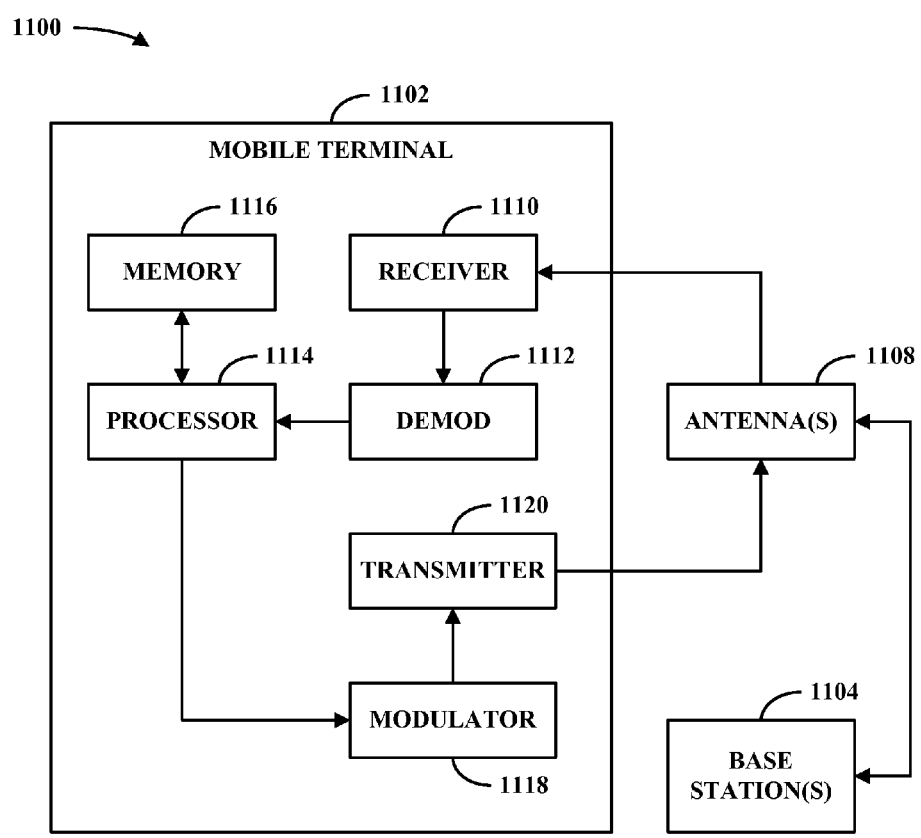

FIG. 11 is a block diagram of another system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Additionally, mobile terminal 1102 can employ processor 1114 to perform methodologies 400, 500, 600, 700, and/or other similar and appropriate methodologies. Mobile terminal 1102 can also employ one or more components described in previous figures to effectuate the described functionality; in one example, the components can be implemented by the processor 1114. Mobile terminal 1102 can also include a modulator 1118 that can multiplex a signal for transmission by a transmitter 1120 through antenna(s) 1108.

Figure 12:
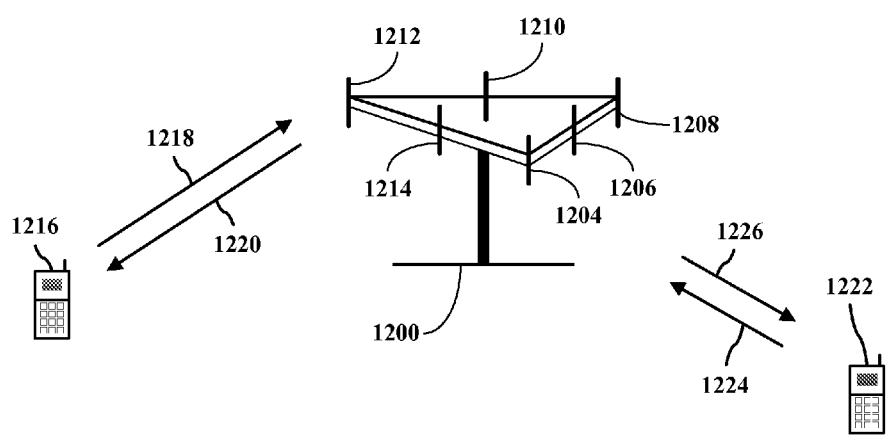
FIG. 12 illustrates an example wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequency for communication. For example, forward link 1220 may use a different frequency then that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, an eNB, an access network, and/or other suitable terminology. In addition, an access terminal, e.g., an access terminal 1216 or 1222, can also be referred to as a mobile terminal, user equipment, a wireless communication device, a terminal, a wireless terminal, and/or other appropriate terminology.

Figure 13:
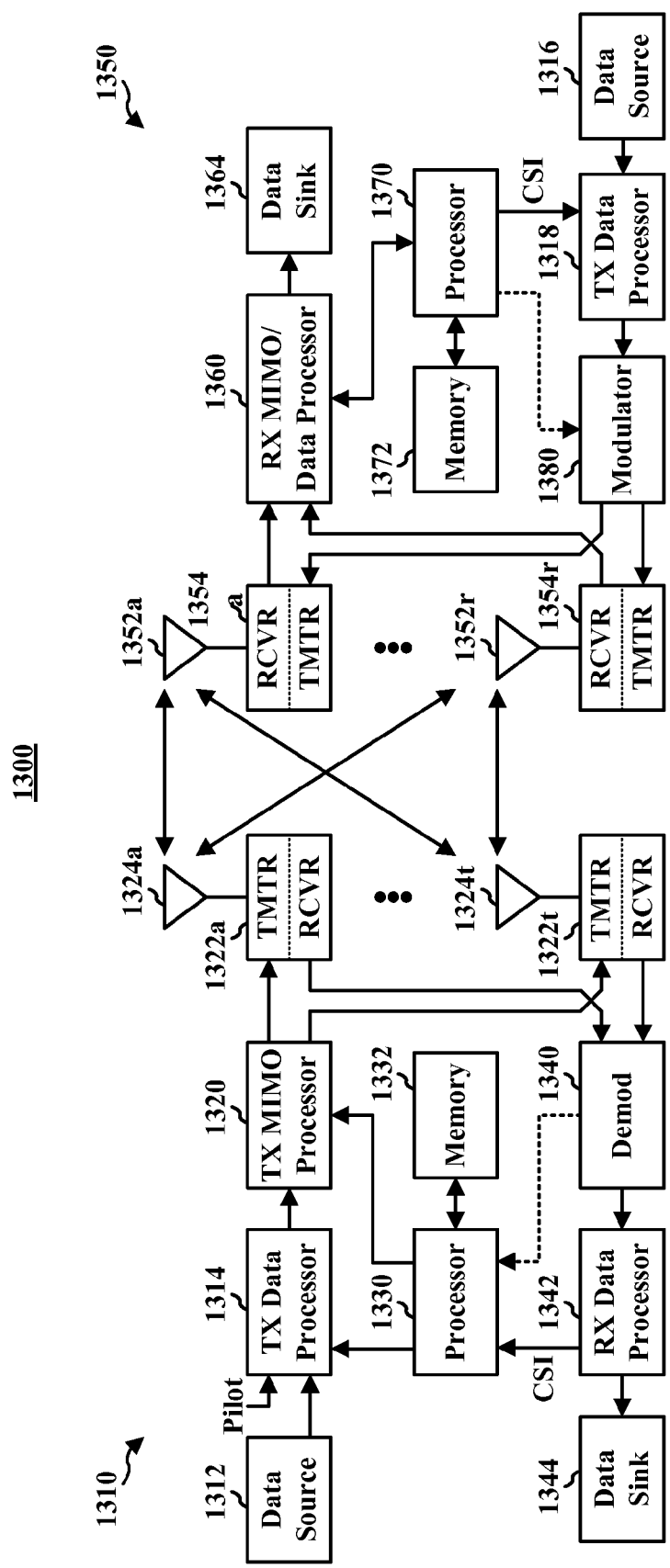
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX processor 1320, which can further process the modulation symbols (e.g., for OFDM). TX MIMO processor 1320 can then provides $N_T$ modulation symbol streams to $N_T$ transceivers 1322a through 1322t. In one example, each transceiver 1322 can receive and process a respective symbol stream to provide one or more analog signals. Each transceiver 1322 can then further condition (e.g., amplify, filter, and upconvert) the analog signals to provide a modulated signal suitable for transmission over a MIMO channel. Accordingly, $N_T$ modulated signals from transceivers 1322a through 1322t can then be transmitted from $N_T$ antennas 1324a through 1324t, respectively.

In accordance with another aspect, the transmitted modulated signals can be received at receiver system 1350 by $N_R$ antennas 1352a through 1352r. The received signal from each antenna 1352 can then be provided to respective transceivers 1354. In one example, each transceiver 1354 can condition (e.g., filter, amplify, and downconvert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX processor 1360 can then process each symbol stream at least in part by demodulating, deinterleaving, and decoding each detected symbol stream to recover traffic data for a corresponding data stream. Thus, the processing by RX processor 1360 can be complementary to that performed by TX MIMO processor 1320 and TX data processor 1316 at transmitter system 1310. RX processor 1360 can additionally provide processed symbol streams to a data sink 1364.

In accordance with one aspect, the channel response estimate generated by RX processor 1360 can be used to perform space/time processing at the receiver, adjust power levels, change modulation rates or schemes, and/or other appropriate actions. Additionally, RX processor 1360 can further estimate channel characteristics such as, for example, signal-to-noise-and-interference ratios (SNRs) of the detected symbol streams. RX processor 1360 can then provide estimated channel characteristics to a processor 1370. In one example, RX processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1316 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method that facilitates buffer status report robustness, the method comprising:
   transmitting a buffer status report;
   starting a timer to track an amount of time since transmitting the buffer status report;
   determining whether information indicative of an authorization to transmit buffered data has been received;
   when information indicative of an authorization to transmit buffered data has been received, restarting the timer;
   when information indicative of an authorization to transmit buffered data has not been received and after a selected amount of time since transmitting the buffer status report, determining whether data is buffered for transmission; and
   when the selected amount of time has elapsed, the information indicative of the authorization to transmit the buffered data has not been received, and data is buffered for transmission, transmitting a second buffer status report.

2. The method of claim 1, wherein the information indicative of the authorization to transmit the buffered data is an uplink grant.

3. The method of claim 1, wherein the transmitting the buffer status report and the transmitting the second buffer status report are transmitted on a Medium Access Control (MAC) layer.

4. The method of claim 1, further comprising receiving configuration information indicative of the selected amount of time.

5. The method of claim 1, further comprising receiving configuration information for determining whether the information indicative of the authorization to transmit the buffered data has been received and data is buffered for transmission.

6. A computer program product, stored on a non-transitory computer-readable medium, and comprising:
   code for transmitting a buffer status report;
   code for starting a timer to track an amount of time since transmitting the buffer status report;
   code for determining whether information indicative of an authorization to transmit buffered data has been received;
   code for restarting the timer when information indicative of an authorization to transmit buffered data has been received;
   code for determining whether data is buffered for transmission when information indicative of an authorization to transmit buffered data has not been received and after a selected amount of time since transmitting the buffer report; and
   code for transmitting a second buffer status report when the selected amount of time has elapsed, the information indicative of the authorization to transmit the buffered data has not been received, and data is buffered for transmission.

7. An apparatus that facilitates buffer status report robustness, the apparatus comprising:
   a buffer module configured to store buffered data;
   a controller module configured to generate a buffer status report indicative of an amount of the buffered data;
   a transmitter module configured to transmit the buffer status report;
   a receiver module configured to receive information indicative of an authorization to transmit buffered data; and
   a timer module configured to expire after a selected amount of time since transmission of the buffer status report,
   wherein the controller module is also configured to:
      determine whether the receiver module has received information indicative of an authorization to transmit buffered data,
      restart the timer module when the receiver module has received information indicative of an authorization to transmit buffered data,
      determine whether the buffer module is storing buffered data when the receiver module has not received information indicative of an authorization to transmit buffered data and the timer module has expired, and
      cause the transmitter module to transmit a second buffer status report when the timer module has expired, the receiver module has not received information indicative of an authorization to transmit buffered data, and the buffer module is storing buffered data.

8. The apparatus of claim 7, wherein the timer module is one of a plurality of timer modules, and the timer module is selected and the selected amount of time is determined based on configuration information received at the apparatus.

9. An apparatus that facilitates buffer status report robustness, the apparatus comprising:
   a buffer for buffering data;
   means for generating a buffer status report indicative of an amount of buffered data in the means for buffering data;
   a transmitter for transmitting the buffer status report;
   a receiver for receiving information indicative of an authorization to transmit the buffered data; and
   means for timing an amount of time since transmission of the buffer status report, the means for timing being configured to expire after a selected amount of time,
   wherein the means for generating is configured to:
      determine whether the means for receiving has received information indicative of an authorization to transmit buffered data,
      restart the means for timing when the means for receiving has received information indicative of an authorization to transmit buffered data,
      determine whether the means for buffering data is storing buffered data when the means for receiving has not received information indicative of an authorization to transmit buffered data and the means for timing has expired, and
      cause the means for transmitting to transmit a second buffer status report when the means for timing has expired, the means for receiving has not received information indicative of the authorization to transmit the buffered data and the means for buffering data is storing buffered data.

10. The apparatus of claim 9, wherein the means for timing is configured by a means for communication to which the apparatus is communicatively coupled.

11. A method that facilitates buffer status report robustness, the method comprising:
   receiving an initial buffer status report transmitted from an access terminal;
   transmitting to the access terminal, information indicative of an authorization to transmit data, in response to receiving the initial buffer status report transmitted from the access terminal and determining that a required amount of data is buffered for transmission;
   receiving a subsequent buffer status report transmitted from the access terminal when a timer tracking a selected amount of time since the initial buffer status report was transmitted from the access terminal has elapsed, the information indicative of an authorization to transmit data has not been received by the access terminal, and data is buffered for transmission,
   wherein the timer is restarted when information indicative of an authorization to transmit buffered data has been received by the access terminal.

12. The method of claim 11, wherein the information indicative of the authorization to transmit data is an uplink grant.

13. The method of claim 11, wherein the buffer status report transmitted from the access terminal is received on a Medium Access Control (MAC) layer.

14. The method of claim 11, further comprising transmitting configuration information indicative of the selected amount of time.

15. The method of claim 11, further comprising transmitting configuration information for determining whether the information indicative of the authorization to transmit data has not been received and data is buffered for transmission.

16. A computer program product, stored on a non-transitory computer-readable medium, and comprising:

code for receiving an initial buffer status report transmitted from an access terminal; and code for, in response to receiving the initial buffer status report transmitted from the access terminal and determining that a required amount of data is buffered for transmission, transmitting to the access terminal, information indicative of an authorization to transmit data;

code for receiving a subsequent buffer status report transmitted from the access terminal when a timer tracking a selected amount of time since the initial buffer status report was transmitted from the access terminal has elapsed, the information indicative of an authorization to transmit data has not been received by the access terminal, and data is buffered for transmission, wherein the timer is restarted when information indicative of an authorization to transmit buffered data has been received.

17. An apparatus that facilitates buffer status report robustness, the apparatus comprising:

a transmitter module configured to transmit information indicative of an authorization to transmit data buffered at an access terminal;

a receiver module configured to receive an initial buffer status report transmitted from the access terminal and to receive a subsequent buffer status report transmitted from the access terminal when a timer module tracking an amount of time since the initial buffer status report was transmitted from the access terminal has elapsed, the information indicative of an authorization to transmit data has not been received by the access terminal, and data is buffered for transmission, wherein the timer is restarted when information indicative of an authorization to transmit buffered data has been received; and a controller module configured to:
evaluate the initial buffer status report transmitted from the access terminal;
determine whether a required amount of data is buffered at the access terminal for transmission; and
in response to determining that a required amount of data is buffered at the access terminal for transmission, control the transmitter module to transmit to the access terminal, the information indicative of the authorization to transmit the data buffered at the access terminal.

18. The apparatus of claim 17, wherein the information indicative of the authorization to transmit the data is an uplink grant.

19. The apparatus of claim 17, wherein the controller module is also configured to configure the timer module at an access terminal to which the apparatus is communicatively coupled.

20. An apparatus that facilitates buffer status report robustness, the apparatus comprising:

a transmitter for transmitting information indicative of an authorization to transmit data buffered at a user communication means;

means for receiving an initial buffer status report transmitted from the user communication means and for receiving a subsequent buffer status report transmitted from the user communication means when a timer tracking an amount of time since the initial buffer status report was transmitted from the user communication means has elapsed, the information indicative of an authorization to transmit data has not been received by the user communication means, and data is buffered for transmission, wherein the timer is restarted when information indicative of an authorization to transmit buffered data has been received; and means for controlling, the means for controlling being configured to:
evaluate the initial buffer status report transmitted from the user communication means;
determine whether a required amount of data is buffered at the user communication means for transmission; and
in response to determining that a required amount of data is buffered at the user communication means for transmission, control the means for transmitting to transmit to the user communication means, the information indicative of the authorization to transmit the data buffered at the user communication means.

21. The apparatus of claim 20, wherein the means for controlling is further configured to generate and to transmit information for configuring the selected amount of time at the user communication means.

22. A system for facilitating buffer status report robustness, the system comprising:

a wireless communication channel;

a base station configured to communicate over the wireless communication channel; and an access terminal configured to transmit to the base station over the wireless communication channel, the access terminal comprising:
a buffer module configured to store buffered data;
a first controller module configured to generate a buffer status report indicative of an amount of the buffered data;
a first transmitter module configured to transmit the buffer status report to the base station;
a first receiver module configured to receive information indicative of an authorization to transmit the buffered data, wherein the information indicative of the authorization to transmit the buffered data is received from the base station; and
a timer module configured to expire after a selected amount of time since transmission of the buffer status report to the base station, wherein the first controller module is also configured to:
determine whether the first receiver module has received information indicative of an authorization to transmit buffered data,
restart the timer module when the first receiver module has received information indicative of an authorization to transmit buffered data,
determine whether the buffer module is storing buffered data when the first receiver module has not received information indicative of an authorization to transmit buffered data and the timer module has expired, and
cause the first transmitter module to transmit a second buffer status report when the timer module has expired, the first receiver module has not received information indicative of an authorization to transmit buffered data, and the buffer module is storing buffered data.

23. The system of claim 22, wherein the base station comprises:

a second transmitter module configured to transmit the information indicative of the authorization to transmit the buffered data at the access terminal; and a second receiver module configured to receive the buffer status report and the second buffer status report that are transmitted from the access terminal.

24. The system of claim 23, wherein the base station further comprises a second controller module configured to generate information for configuring the selected amount of time at the access terminal.

25. The system of claim 24, wherein the information indicative of the authorization to transmit the buffered data is an uplink grant.

26. The system of claim 24, wherein the buffer status report is transmitted and the second buffer status report is transmitted on a Medium Access Control (MAC) layer.

27. The system of claim 24, wherein the buffer status report and the second buffer status report are each included in a MAC control element.

28. The system of claim 24, wherein the timer module is configured by the base station.

29. A method that facilitates buffer status report robustness, the method comprising:
transmitting a buffer status report;
starting a timer to track an amount of time since transmitting the buffer status report;
determining whether information indicative of an authorization to transmit buffered data has been received;
when information indicative of an authorization to transmit buffered data has been received, restarting the timer;
when information indicative of an authorization to transmit buffered data has not been received and after a selected amount of time since transmitting the buffer status report, determining whether data is buffered for transmission;
when the selected amount of time has elapsed, the information indicative of the authorization to transmit the buffered data has not been received and data is buffered for transmission, transmitting a second buffer status report;
receiving the second buffer status report that is transmitted; and
transmitting to an access terminal, the information indicative of the authorization to transmit the buffered data, in response to receiving the buffer status report that is transmitted from the access terminal, and determining that a required amount of data is buffered for transmission.

30. The method of claim 29, further comprising transmitting configuration information to the access terminal for determining whether the information indicative of the authorization to transmit the buffered data has been received and data is buffered for transmission.

31. The method of claim 29, further comprising transmitting configuration information indicative of the selected amount of time to the access terminal.

* * * * *